United States Patent

[11] 3,556,238

| [72] | Inventor | William L. Figura |
| | | Bruce, Wis. |
| [21] | Appl. No. | 750,412 |
| [22] | Filed | July 5, 1968 |
| [45] | Patented | Jan. 19, 1971 |
| | | Continuation-in-part of application Ser. No. 552,118, May 23, 1966, now abandoned. |

[54] LAND AND WATER VEHICLE
9 Claims, 12 Drawing Figs.

[52] U.S. Cl............................................. 180/51,
180/89, 280/5, 280/111
[51] Int. Cl.................................................. B60k 17/34
[50] Field of Search........................................ 180/49, 50,
51, 44; 280/111, 112, 109, 110

[56] References Cited
UNITED STATES PATENTS

| 2,827,715 | 3/1958 | Wagner.................... | 180/51UX |
| 3,133,745 | 5/1964 | Granning.................... | 280/112 |
| 3,189,117 | 6/1965 | Ammon....................... | 180/51 |
| 3,253,671 | 5/1966 | Fielding...................... | 180/51 |
| 3,266,591 | 8/1966 | Sampietro et al............. | 180/44X |

*Primary Examiner*—A. Harry Levy
*Attorney*—Robert M. Dunning

ABSTRACT: An articulated vehicle includes a forward section and a rear section, each supported by a pair of axially aligned wheels. A transmission is supported by the frame of the forward section and is connected to drive the wheels of both sections. A motor is mounted on the transmission rearwardly of the vehicle seat. A bracket is pivotally supported on a generally vertical pivot between two vertically spaced bracket plates on the rear of the front section. A generally horizontal sleeve is supported by the bracket and extends through the front of the frame of the rear section to pivotally connect the two sections.

INVENTOR
WILLIAM L. FIGURA
BY Robert M. Dunning
ATTORNEY

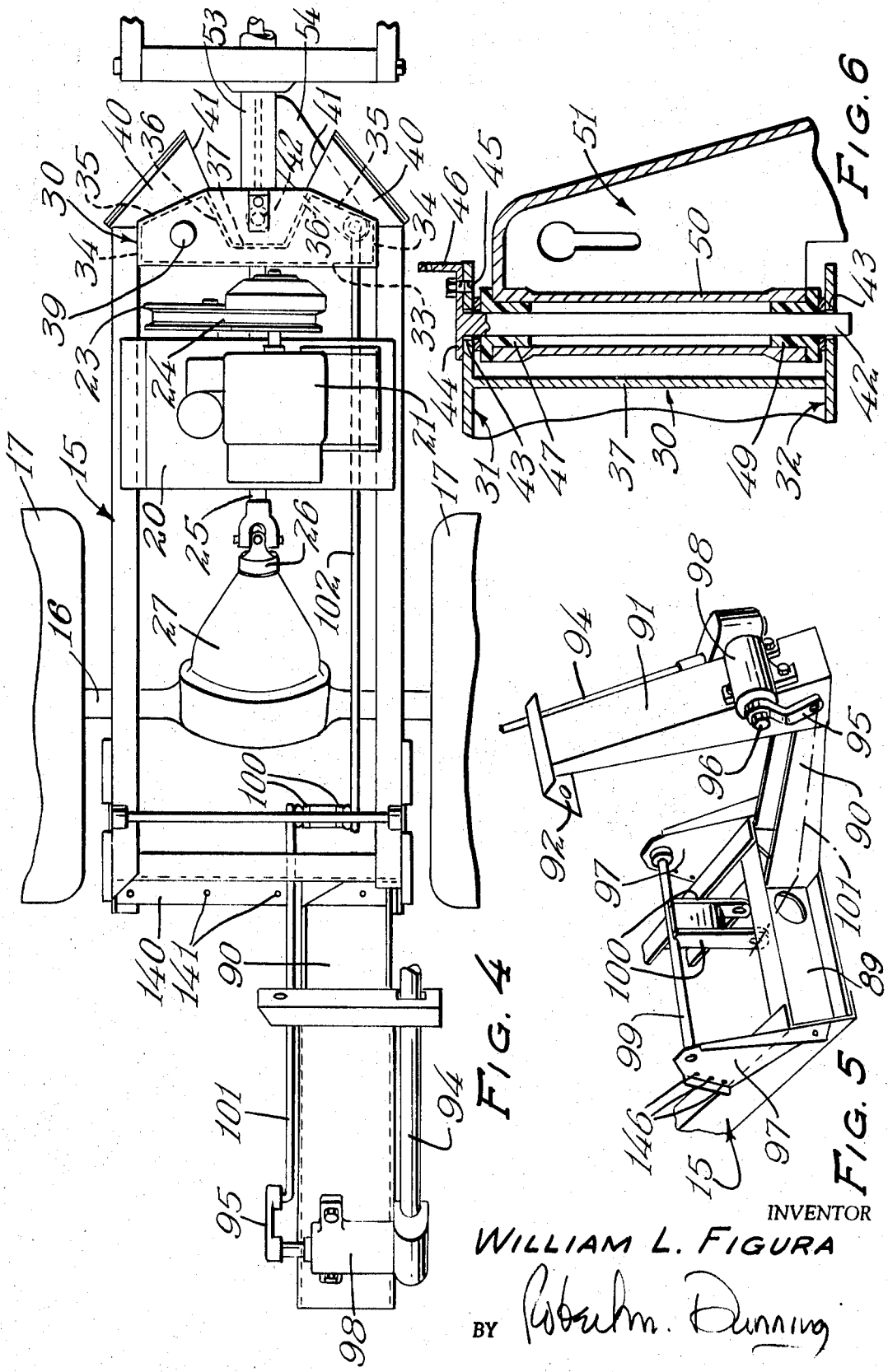

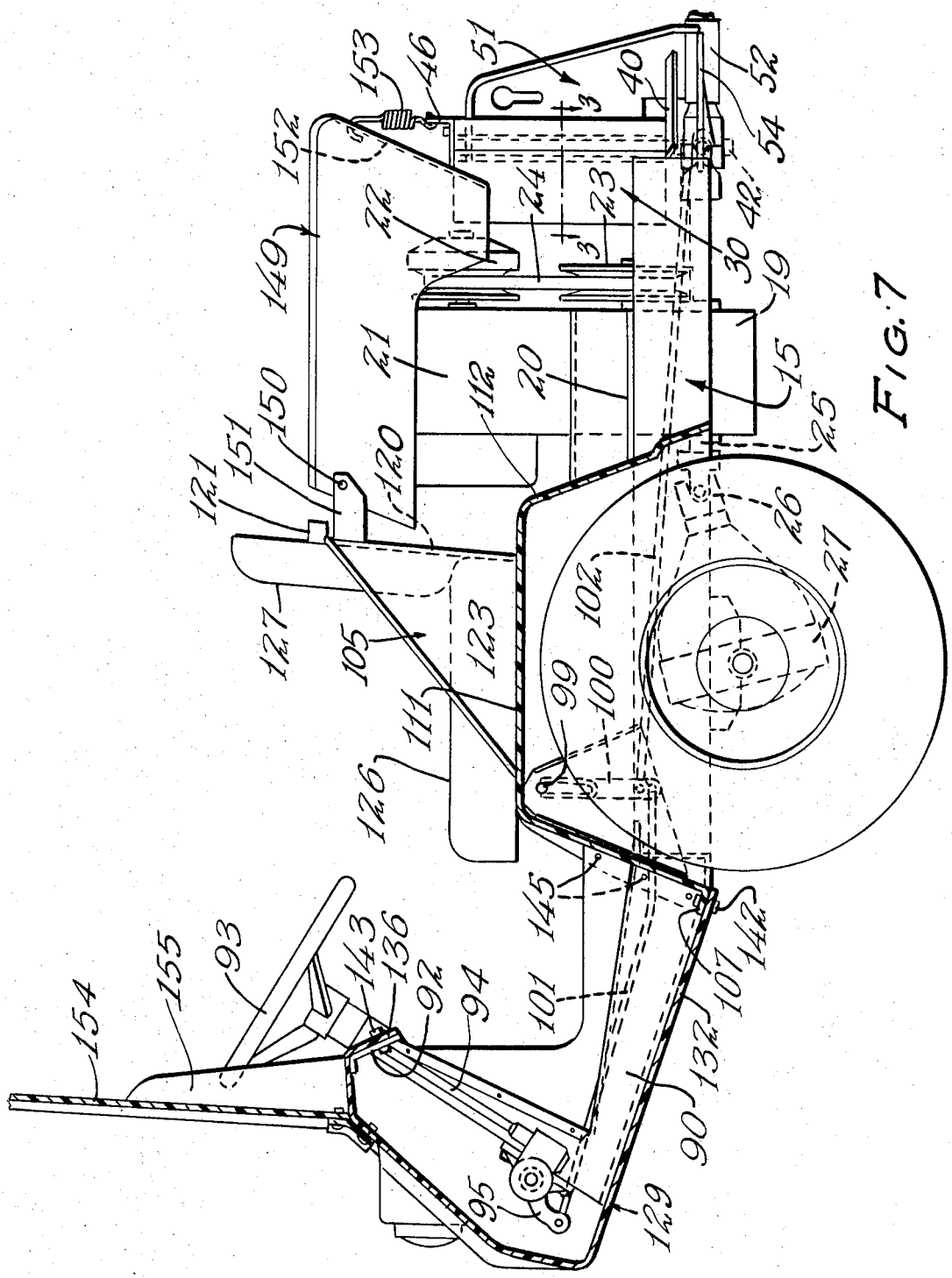

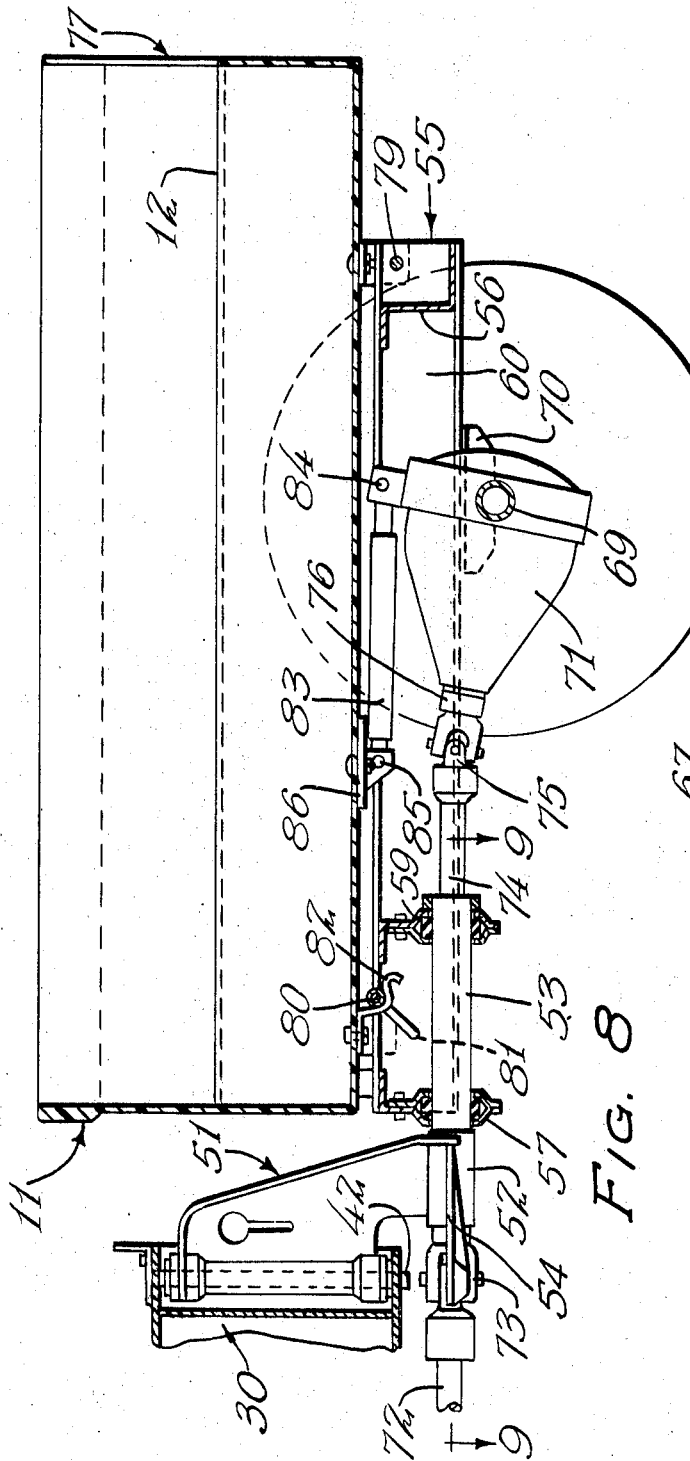
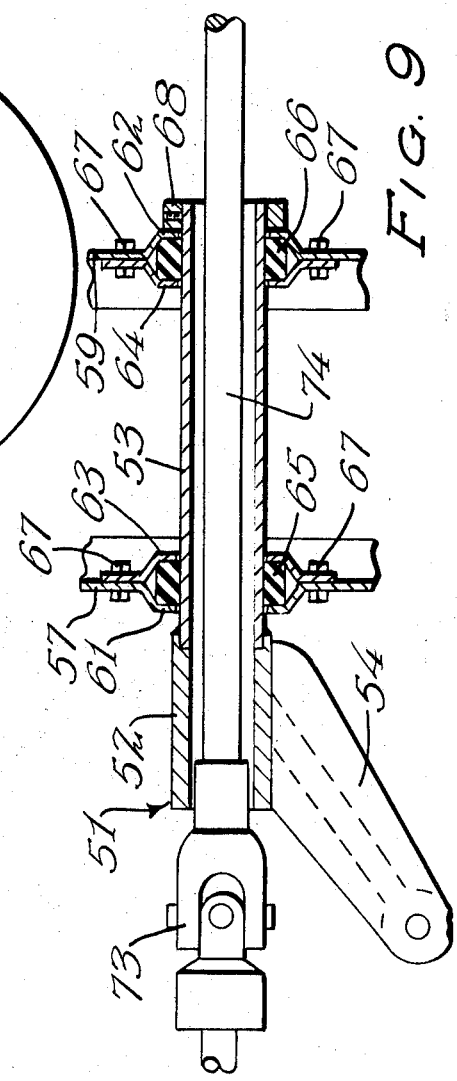

INVENTOR
WILLIAM L. FIGURA
BY Robert M. Dunning
ATTORNEY

LAND AND WATER VEHICLE

This is a continuation in part of application Ser. No. 552,118 filed May 23, 1966 for Land Water Vehicle and since abandoned.

This invention relates to an improvement in articulated vehicle and deals particularly with a vehicle capable of traveling over extremely rough terrain.

The present device comprises an articulated vehicle of the type which includes a two wheeled tractor and a two wheeled trailer which are connected together in such a manner that the tractor and trailer may pivot freely relative to one another to permit the steering of the device, and also to permit both sections of the vehicle to rest firmly on the ground at all times. The device is capable of traveling over rocks, logs, and other such obstructions, making it adaptable for use in environments where a vehicle of conventional form would be useless. As a result, the vehicle may travel over country which would be virtually inexcessible by any other type of land vehicle.

A feature of the present invention resides in the provision of a four wheel drive vehicle including a motor which drives a transmission and including means extending both forwardly and rearwardly from the transmission to differentials mounted on both the front and rear axles, The propeller shaft which extends rearwardly from the motor extends through a suitable connection about which the rear section or trailer portion of the device may pivot. A universal joint is centered between the two parts of the vehicle so that the trailer portion may pivot about a vertical axis relative to the other portion of the device. The steering of the device is accomplished at the joint between the tractor section and the trailer section.

A feature of the present invention resides in the provision of a novel type of support for connecting the trailer section to the tractor section. A pair of vertically spaced plates on the tractor section support a vertical pivot pin pivotally supporting a bracket terminating at its lower end in a sleeve through which the propeller shaft extends. A universal joint connects the driven shaft of the motor to the propeller shaft leading to the rear wheels, and this universal joint is outlined with the vertical pivot so that the trailer part of the device may turn relative to the tractor part thereof.

A feature of the present invention resides in the provision of a device of the type described in which the fuel tank for the motor forms a part of the connecting means connecting the two sections of the device together. The fuel tank is provided with a vertical notch in which is located the forward end of the pivotal bracket connecting the tractor to the trailer. In other words, the upper and lower plates forming the top and bottom of the fuel tank serve as pivots for the pivot pin connecting the two sections of the device.

A further feature of the present invention resides in the provision of means for dampening the rotative movement of one section of the device relative to the other. Rubber rings are secured under compression encircling the tubular member connected to the front section of the device to limit or reduce the tendency for the trailer to rotate about its axis.

A further feature of the present invention resides in the provision of a device of the type described having a novel type of frame. The frame of the tractor portion of the device comprises a generally rectangular body supporting at its rear end the combination gasoline tank and pivotal bracket support, and having at its forward end a forwardly and upwardly inclined frame member to which is secured an upwardly and rearwardly inclined steering post support, the frame being integrally welded together. In view of the fact that the transmission, the motor, and the steering wheel are all mounted upon a single integral frame, the device is extremely sturdy and rigid and is capable of withstanding considerable stress and strain.

A further feature of the present invention resides in the provision of a novel and effective way of making the body for the tractor portion of the device. The body is preferably formed of plastic which is extremely resistant to stresses and strains. The body portion is connected to the frame at a minimum of points so that the body is free to deflect to some extent relative to the frame. As a result, the body is capable of traveling through underbrush and small trees without becoming damaged.

These and other objects and novel features of the present invention will be more clearly and fully set forth in the following specification and claims. In the drawings forming a part of the specification.

FIG. 4 is a diagrammatic view of the frame portion of the tractor device.

FIG. 5 is a perspective view of the forward portion of frame of the tractor portion of the device.

FIG. 6 is a vertical sectional view through the pivotal connection between the two portions of the vehicle.

FIG. 7 is a side elevational view of the forward portions of the body being broken away to disclose the interior construction, on the line 7–7 of FIG. 2.

FIG. 8 is a vertical section through the rear portion of the device.

FIG. 9 is a sectional view through a portion of the propellor shaft driving the trailer portion of the device, the position of the section being indicated by the line 9–9 of FIG. 8.

Figure 1:
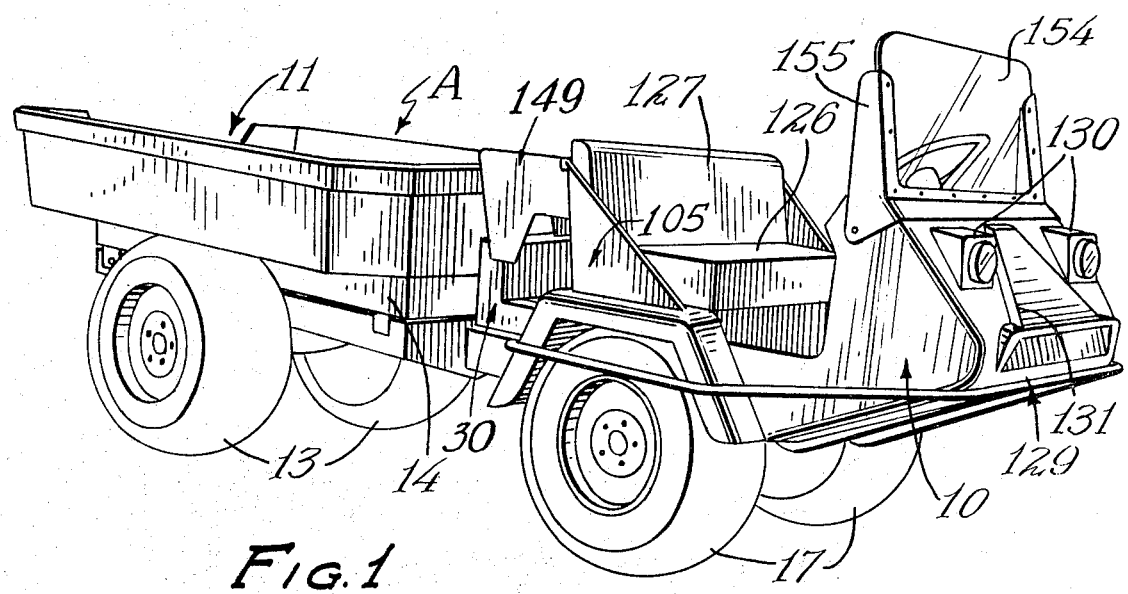
FIG. 1 is a perspective view of the articulated vehicle showing the general arrangement of parts therein.
Figure 2:
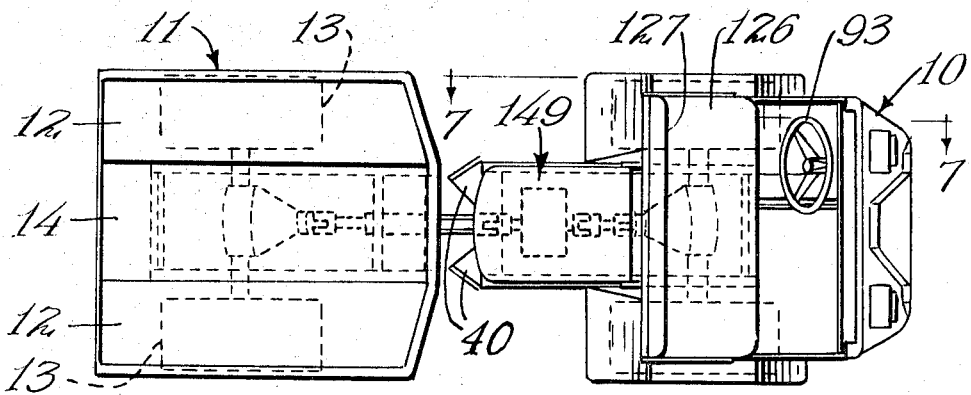
FIG. 2 is a top plan view of the vehicle indicated in FIG. 1.
Figure 3:
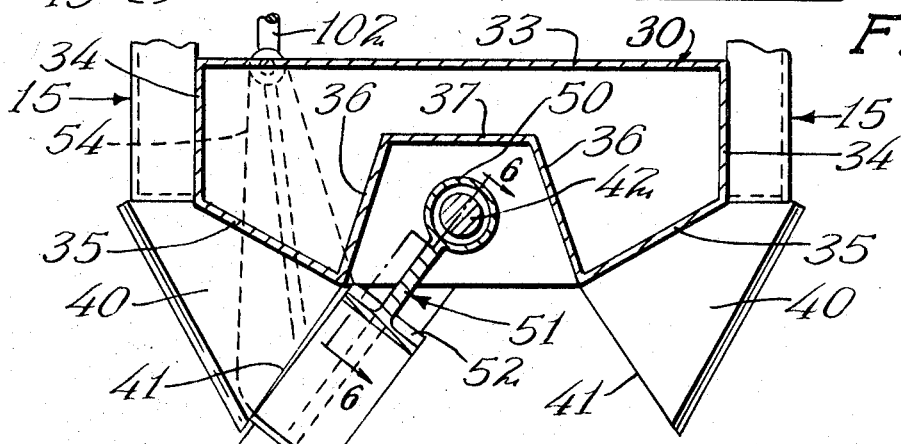
FIG. 3 is a horizontal sectional view through the rear portion of the tractor part of the device, showing the manner in which the two parts of the vehicle are hingedly connected.

The vehicle is indicated in general by the letter A and includes a tractor portion which is indicated in general by the numeral 10, and a trailer portion which is indicated in general by the numeral 11. The trailer portion 11 may comprise a passenger compartment with a pair of seats 12 extending along opposite sides over the rear tires 13, and a central lower portion 14 beneath the seats 12 for accommodating the feet of the passengers. Alternatively, as will be described, the body of the trailer portion may comprise a dump body designed to contain a load of material and capable of being tilted for dumping purposes. In general, the forward portion of the device includes a generally rectangular frame 15 which supported by a transverse axle 16 supporting a pair of front wheels 17. A transmission 19 is supported by a platform 20 extending across the frame near the rear end thereof, and an internal combustion engine 21 is mounted above the transmission 19. A variable speed drive device connects the engine 21 with the transmission 19, the variable speed device including a pulley 22 on the engine, a cooperable pulley 23 on the transmission, and a suitable connecting belt chain 24. A shaft 25 extends from the forward end of the transmission 19 and is connected by a universal joint 26 to a differential within the differential housing 27. The differential housing 27 is mounted upon the front axle 16, and suitable gears within the differential 27 connect the forwardly extending shaft 25 to the front wheels 17. In view of the fact that such devices are well known in the art, the structural detail is not shown.

A fuel tank 30 extends across the rear end of the frame 15. The gas tank 30 includes a top panel 31 and a bottom panel 32 (see FIG. 6) which are connected along their forward edges by a vertical flat panel 33. The rear side of the fuel tank is formed to provide sidewalls 34, forwardly and inwardly inclined front panels 35 connected to the rear edges of the sides 34, inwardly and forwardly inclined rear panels 36 converging forwardly and inwardly from the rear panels 35, and a connecting panel 37 which is in spaced relation to the forward panel 33. The various panels are welded or otherwise secured toe together in to form an enclosed fuel chamber. A filling opening in the top of the tank is normally closed by a cap 39. Radius control plates 40 are welded to the rear edge of the frame 15 and to the undersides of the tank bottom panel 32. The inner opposed edges 41 of the plates 40 diverge apart rearwardly, and act to limit the pivotal movement of the trailer section 11 of the device relative to the front section 10 thereof.

As indicated in FIG. 6, a vertical pivot 42 extends through a vertically aligned aperture such as 43 in the upper and lower plates 31 and 32 rearwardly of the fuel enclosure. The pivot 42 is provided as its upper end with a plate 44 which rests upon the upper plate 31 and is detachably secured thereto by a bolt 45. An ear 46 extends upwardly from the rear edge of the plate 44.

The pivot 42 supports a pair of vertically spaced bearings 47 and 49 which extend into the upper and lower ends respectively of a tubular member 50 forming a part of the pivot bracket 51. The pivot bracket 51 is pivotal about the vertical axis of the pivot 42 and serves to pivotally connect the tractor portion 10 of the vehicle to the trailer portion 11 thereof. The bracket 51 supports at its lower rear end a tubular casting 52 having a substantially horizontal axis which intersects the vertical axis of the sleeve 50 at substantially right angles. A sleeve 53 is welded or otherwise secured in axial alignment with the tubular member 52 as indicated in FIG. 9 of the drawings. A steering arm 54 is secured to the tubular member 52, and extends laterally and somewhat forwardly therefrom.

The trailer portion 11 of the device includes a generally rectangular frame 55 having a Z-shaped crossmember 56 at its rear end, and having a pair of longitudinally spaced angular crossmembers 57 and 59 extending between the longitudinal frame sides 60 near the forward ends thereof. The crossmembers 57 and 59 include offset cuplike flanges 61, 62 which are apertured to accommodate the sleeve 53. Cooperable cup-shaped flanges 62 and 63 are also apertured to accommodate the sleeve 53 in opposed relation to the flanges 61 and 62. Resilient rings 65 and 66 are clamped between the opposed flanges 61 and 63, and between the opposed flanges 62 and 64 which are connected together by clamping bolts 67. These resilient rings 65 and 66 tend to restrict the sleeve 53 from rotation relative to the frame 55 of the trailer 11. In other words, the sleeve 53 may rotate about a substantially horizontal longitudinal axis, but cannot pivot freely. A collar 68 on the sleeve 53 holds the sleeve from axial movement.

An axle 69 is supported by suitable brackets 70 on the frame 55, the axle being supported by the rear wheels 13. A differential housing 71 is supported on the axle 69. A shaft 72 extends rearwardly from the transmission 19 and is connected through a universal joint 73 to a propeller shaft 74 extending through a tubular portion 52 of the bracket 51, and through the sleeve 53. The rear end of the propeller shaft 74 is connected by a second universal joint 75 to the shaft 76 leading into the differential 71. Rotation of the shaft 76 acts through the various gears within the differential housing 71 to drive the rear wheels 13. It will be noted that the universal joint 73 is aligned with the vertical pivot 42 so that the rotation of the propeller shaft is not impaired by the pivoting of the two parts of the device when the vehicle is traveling about a corner.

In the particular arrangement illustrated, the body 77 of the trailer is hingedly connected to the frame 55 by means of aligned pivots 79 which extend transversely of the frame. The body 77 is normally restrained from pivotal movement by a crank arm 80 pivotally supported extending transversely of the body on an axis 81, and engageable with a suitable catch 82 on the undersurface of the body 77. By pivoting the crank arm 80, the crank may be disengaged from the resilient catch 82. A hydraulic cylinder 83 is pivotally secured to the transmission housing at 84 and includes a piston rod pivotally connected at 85 to a bracket 86 on the undersurface of the body 77. Hydraulic fluid may be directed to the cylinder 83 for tilting the body 77 when desired. The hydraulic connections have been omitted in the interest of simplicity.

As is indicated in FIG. 5 of the drawings, a generally Z-shaped cross member 89 extends across the front of the frame 15. A channel shaped frame member 90 projects forwardly from the cross member 89, and inclines forwardly and upwardly therefrom. A channel shaped frame member 91 extends upwardly and rearwardly from the forward end of the frame member 90. A cross brace 92 is welded or otherwise secured to the upper end of the frame member 91.

A steering wheel 93 is mounted upon a steering shaft 94 extending along side of the frame member 91. The lower end of the steering shaft 94 extends into the gear reduction member 98 mounted upon the frame member 91. The arrangement is such that rotation of the steering shaft 94 acts to oscillate a lever arm 95 mounted upon a substantially horizontal shaft 96 which is driven by the gearing from the shaft 94. A pair of brackets 97 are secured to opposite sides of the frame 15 to extend upwardly therefrom near the forward end thereof. The brackets 97 support a transverse shaft 99 to which are secured a pair of arms 100. One of the arms 100 is connected to the arm 95 by a link 101 (FIG. 7). The other of the arms 100 is connected by a second link 102 to the steering arm 54 thus rotation of the steering wheel 93 acts through the links 101 and 102 to pivot the bracket 51 about the axis of the pivot 42.

Figure 10:
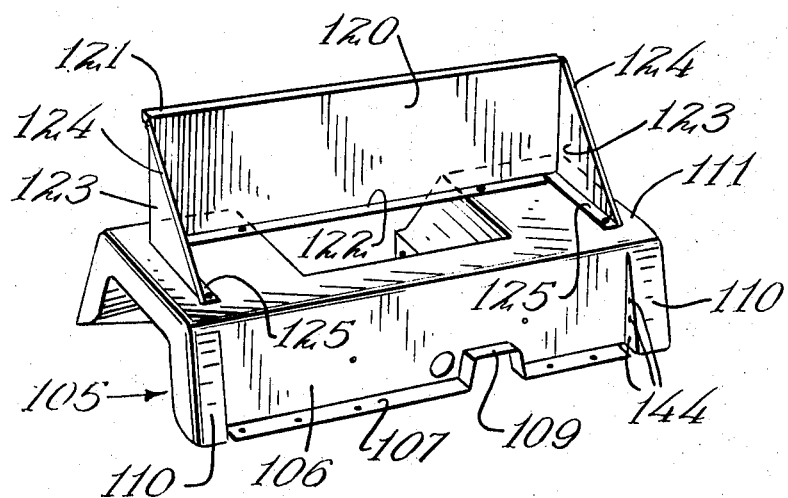
FIG. 10 is a perspective view of the fender forming portion of the tractor section of the device.
Figure 11:
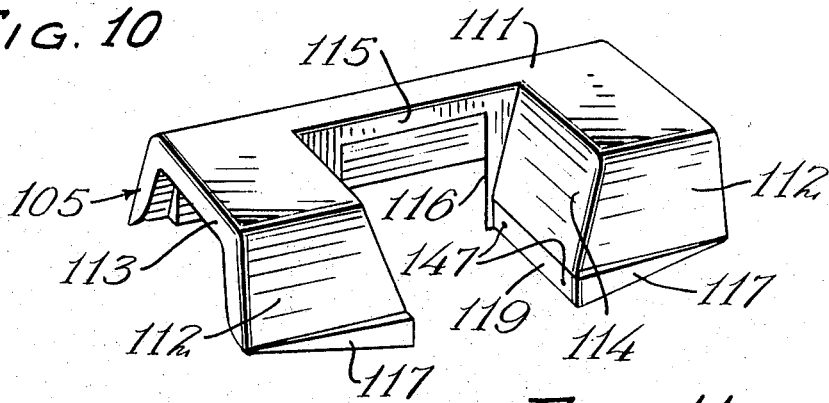
FIG. 11 is a rear perspective view of the structure shown in FIG. 10.
Figure 12:
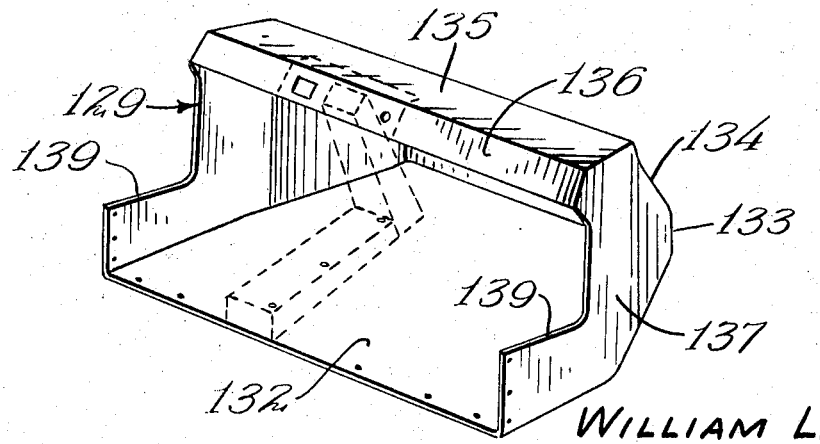
FIG. 12 is a perspective view of the forward end portion of the tractor section of the device.

The body of the device is shown in its entirety in FIG. 1, and the two main parts of the body are shown in FIGS. 10 and 12. The fender and seat portion 105 is shown in FIGS. 10 and 11 and includes an upwardly and rearwardly inclined front wall 106 having a generally horizontal flange 107 along its forward edge. The wall 106 is notched as indicated at 109 to accommodate the frame member 90. The ends of the wall 106 are forwardly ribbed as indicated at 110 to rigidify the body portion.

A generally U-shaped top panel 111 is connected along its forward edge to the upper edge of the panel 106. The opposite sides of the top panel 111 extend over the front wheels 17 and form the tops of the fenders. Downwardly and rearwardly slooping walls 112 (FIG. 11) form the rear portions of the fenders. Substantially U-shaped flanges 113 form the outer sides of the fenders. The inner sides of the fenders are formed by downwardly and inwardly inclined opposed walls panels 114 which are connected by a front panel 115 having a generally U-shaped central notch 116 therein designed to fit about the motor. Reinforcing ribs 117 extend along the lower edges of the rear panels 112 and continuing flanges 119 extend along the lower edges of the inner fender walls 114.

A seat support is bolted or otherwise secured to the top panel 111 of the seat and fender section 105. An upwardly and rearwardly inclined rear wall pane 120 forms the back of the seat support and is reinforced by a flange or reinforcing bar 121 extending along the upper edge of the panel 120, and a flange 122 along its lower edge. Triangular sidewall panels 123 are connected to the opposite ends of the rear panel 120 and are reinforced by diagonal reinforcing flanges 124, and inturned flanges 125, the latter extending along the lower edges of the sidewalls in coplanar relation with the flange 122. The flanges 122 and 125 are bolted to the top panel 111 to form a frame for holding the seat. A seat cushion 126 and seat back cushion 127 are secured within the frame and serve to support the driver and a passenger.

The shape of the forward end of the tractor portion of the device is best illustrated in FIG. 1. It will be seen that front end body portion 129 is shaped to include a headlight housing 130 and also exterior ribbing 131 which reinforces the structure and enhances the appearance thereof. The body portion 129 includes a foot board portion 132, a rounded forward end portion 133 leading to an upwardly and rearwardly inclined portion 134 which is connected at its upper end to a top panel 135 which terminates in a downwardly and inwardly inclined dashboard panel 136. Sidewalls 137 are provided on opposite sides of the panes panels previously described, the sidewalls being notched as indicated at 139 to permit the driver and any passenger of the vehicle to enter or leave the tractor.

The seat and fender section 105 is attached to the forward crossmember 140 of the frame 15 by bolts which extend through bolt holes 141 in the frame member. As indicated in FIG. 7, the rear edge of the floor panel 132 is bolted to the flange 107 of the rear and fender section 105 by bolts 142. The dashboard panel 136 extends over the cross brace 92 at the upper end of the steering column support and is bolted thereto as indicated at 143. Bolt holes 144 are also provided in the inner surfaces of the reinforcing ribs 110, and bolts 145 extend through these bolt holes 144, and suitable bolt holes 146 in the frame bracket plates 97 to secure the seat and fender portion to the frame. This portion of the structure is likewise secured to the frame on opposite sides of the motor, as indicated by the bolt holes 147 extending through the parallel reinforcing ribs 119, and designed to accommodate the necessary bolts.

An engine cover 149 of generally U-shaped cross section is pivotally connected at 150 to brackets 151 extending rearwardly from the seat back panel 120. The forward end of the engine cover is opened to permit pivotal movement, while the rear end is closed by a downwardly and forwardly inclined wall 152. A spring clip 153 is attached to the bracket ear 46 and engages the forward end of the engine cover to hold it in place.

A windshield 154 is mounted at the forward end of the top panel 135. The windshield is supported by an inverted generally U-shaped frame 155 anchored at it its ends to the body.

I claim:

1. A vehicle including:
 a forward section and a rear section, a transverse axle of each of said sections;
 a power unit in said forward section;
 a bracket secured to the rear of said forward section and including a pair of vertically spaced bracket plates;
 a cooperable bracket pivotally supported between si said vertically spaced bracket plates on a substantially vertical axis;
 a tubular sleeve supported at the lower end of said cooperable bracket on an axis intersecting the axis of said pivot, the axis of said sleeve being disposed beneath the lowermost of said vertically spaced bracket plates;
 said rear section including a frame including a transverse frame end member through which said sleeve rotatably extends;
 a resilient ring encircling said sleeve, and means holding said ring in a compressed condition against said frame member;
 said resilient ring resisting rotation of said sleeve about its axis;
 drive means connected to said power unit and to said wheels of said axle on said rear section; and
 said drive means including a universal joint substantially aligned with said vertical pivot.

2. The structure of claim 1 and in which said frame includes a second transverse frame member through which said sleeve extends, and including a second resilient ring encircling said sleeve and means holding said second ring in a compressed condition against said second transverse frame member.

3. A vehicle including:
 a forward section and a rear section, a transverse axle on each of said sections;
 a power unit in said forward section;
 a bracket secured to the rear of said forward section and including a pair of vertically spaced bracket plates;
 a cooperable bracket pivotally supported between said vertically spaced bracket plates on a substantially vertical axis;
 a tubular sleeve supported at the lower end of said bracket on an axis intersecting the axis of said pivot and at substantially right angles thereto;
 said rear section including a frame including a transverse frame end member through which said sleeve extends;
 a resilient ring encircling said sleeve and means holding said ring in a compressed condition against said frame end member;
 said resilient ring resisting rotation of said sleeve about its axis, drive means connected to said power unit and to said wheels of said axle on said rear section;
 said drive means including a universal joint substantially aligned with said vertical pivot; and
 said frame end member including a cup-shaped receptacle encircling said sleeve, and in which said means holding said ring comprises a clamping plate bolted to said frame end member.

4. The structure of claim 3 in which said rear section includes a second transverse frame member through which said sleeve extends, a second resilient ring encircling said sleeve and means holding said second ring in a compressed condition against said second transverse frame member, a second cup-shaped receptacle in said second frame member for said resilient rings, and in which said last-mentioned holding means comprises a clamping plate bolted to said second transverse frame member.

5. A vehicle including:
 a forward section and a rear section, a transverse axle on each of said sections, and wheels on said axles;
 a power unit in said forward section;
 a bracket secured to the rear of said forward section and including a pair of vertically spaced bracket plates;
 a cooperable bracket pivotally supported between said vertically spaced bracket plates on a substantially vertical pivot axis;
 a tubular sleeve supported at the lower end of said cooperable bracket beneath the level of said vertically spaced bracket plates on an axis intersecting the axis of said pivot;
 said sleeve having its forward end terminating rearwardly of the axis of said pivot;
 said rear section including a frame having at a transverse frame member through which the rear portion of said sleeve rotatably extends;
 means resisting rotation of said sleeve within said transverse frame member;
 drive means connected to said power unit and to said wheels of said axle on said rear section and including drive shaft means extending through said sleeve; and
 said drive means including a universal joint substantially aligned with said vertical pivot and positioned beneath the lower end of said vertical pivot.

6. A vehicle including:
 a forward section and a rear section;
 a transverse axle on each of said sections;
 wheels on said axles on opposite side of said sections;
 each of said sections including a generally rectangular frame;
 a hollow enclosure tank which is substantially U-shaped in horizontal section secured to, and extending upwardly from, the frame of the forward section at the rear end thereof, the base of the U-shaped enclosure facing forwardly;
 said hollow tank including spaced front and rear walls as well as double sidewalls on either side of center;
 a substantially horizontal parallel plates closing the upper and lower ends of said enclosure and bridging the sides of said U-shaped enclosure;
 a bracket pivotally supported on a substantially vertical pivot supported by said plates;
 means pivotally securing said bracket to said rear section on an axis intersecting the axis of said pivot and at substantially right angles thereto.

7. The structure of claim 6 and in which said last named means includes a sleeve secured to said bracket on said axis intersecting the axis of said pivot and at substantially right angles thereto, said sleeve extending through the forward end of the frame of said rear section and pivotally supported thereby.

8. The structure of claim 7 and including means resisting pivotal movement of said sleeve relative to said frame of said rear section.

9. The structure of claim 7 and including a resilient ring encircling said sleeve, and a clamping plate encircling said sleeve and bolted to said rear section frame outwardly of said ring to compress said ring against said sleeve.